US006941260B2

(12) United States Patent
Emberty et al.

(10) Patent No.: US 6,941,260 B2
(45) Date of Patent: *Sep. 6, 2005

(54) METHOD AND APPARATUS FOR EMULATING A FIBER CHANNEL PORT

(75) Inventors: Robert G. Emberty, Tucson, AZ (US); Craig Klein, Tucson, AZ (US); David D. McBride, Tucson, AZ (US); Gregory A. Williams, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 831 days.

This patent is subject to a terminal disclaimer.

(21) Appl. No.: 09/843,972

(22) Filed: Apr. 26, 2001

(65) Prior Publication Data

US 2002/0161567 A1 Oct. 31, 2002

(51) Int. Cl.[7] .......................... G06F 9/455; G06F 12/00
(52) U.S. Cl. .......................... 703/25; 703/24; 711/110; 711/111; 711/112; 711/113; 711/114; 711/115
(58) Field of Search ............... 703/23–25; 711/110–115

(56) References Cited

U.S. PATENT DOCUMENTS

| | | |
|---|---|---|
| 4,170,031 A | 10/1979 | Beuch et al. |
| 4,761,785 A | 8/1988 | Clark et al. |
| 4,864,511 A | 9/1989 | Moy et al. |
| 5,123,000 A | 6/1992 | Fitzgerald et al. |
| 5,197,055 A | 3/1993 | Hartung et al. |
| 5,289,589 A | 2/1994 | Bingham et al. |
| 5,377,121 A | 12/1994 | Dimitri et al. |
| 5,423,046 A | 6/1995 | Nunnelley et al. |
| 5,638,347 A | 6/1997 | Baca et al. |
| 5,875,063 A | 2/1999 | Corrington et al. |
| 5,915,081 A | 6/1999 | Yamamoto et al. |
| 5,970,030 A | 10/1999 | Dimitri et al. |
| 5,983,357 A | 11/1999 | Sun |
| 6,005,745 A | 12/1999 | Filkins et al. |
| 6,108,684 A | * 8/2000 | DeKoning et al. .......... 718/105 |
| 6,151,331 A | * 11/2000 | Wilson ....................... 370/465 |
| 6,154,793 A | * 11/2000 | MacKenna et al. ........... 710/23 |
| 6,199,112 B1 | * 3/2001 | Wilson ....................... 709/227 |
| 6,324,181 B1 | * 11/2001 | Wong et al. ................ 370/403 |
| 6,396,832 B1 | * 5/2002 | Kranzler ..................... 370/360 |
| 6,470,026 B1 | * 10/2002 | Pearson et al. ............. 370/463 |
| 6,754,768 B2 | * 6/2004 | Dimitri et al. .............. 711/114 |

OTHER PUBLICATIONS

Sun Microsystems Inc. Sun StorEdge(tm) SCSI Target Emulation (STE) 1.1 Release Notes. Part No. 806–1948–10. Aug. 1999, Revision A.*

Cherkasova, L. et al. "Designing Fibre Channel Fabrics." Proc. 1995 IEEE Int'l Conf. on Computer Design (ICCD '95). Oct. 2–4, 1995. pp. 346–351.*

Varma, A. et al. "Performance Evaluation of a High–Speed Switching System Based on the Fibre Channel Standard." Proc. of the 2nd Int'l Symposium on High Performance Distributed Computing, 1993. Jul. 20–23, 1993. pp. 144–151.*

Varma, A. et al. "Using Camp–On to Improve the Performance of a Fibre Channel Switch." Proc. 18th Conf. on Local Computer Networks, 1993. Sep. 19–22, 1993. pp. 247–255.*

(Continued)

*Primary Examiner*—Kevin J. Teska
*Assistant Examiner*—Ayal Sharon
(74) *Attorney, Agent, or Firm*—Quarles & Brady Streich Lang LLP

(57) ABSTRACT

Disclosed is a method and apparatus for emulating a fiber channel port. A controller is provided according to the invention that includes a fabric port and a virtual N port. The controller is adapted to buffer incoming data and convert an N port address provided with the data by a host computer to an instruction to the picker to couple the disk drive corresponding to the requested N port address to the virtual N port.

17 Claims, 5 Drawing Sheets

OTHER PUBLICATIONS

Berg, G. MCSE Networking Essentials. © 1998. pp. 51–55.*
IBM Technical Disclosure Bulletin, Oct. 1, 1994. "Physical Address Registers for a Fibre–Channel Protocol." TDB–ACC–NO: NN9410607.*
Partridge, C. BBN Systems and Technologies. "Workshop Report: Internet Research Steering Group Workshop on Very–High–Speed Networks" BBN Systems and Technologies. Apr. 1990. Especially: Session 8.*
Teow, K.S. Brocade Communications Systems. "Definitions of Managed Objects for the Fabric Element in Flbre Channel Standard". May 1, 2005.*
"American National Standard for Information Technology—Fibre Channel—Single–Byte Command Code Sets Mapping Protocol (FC–SB)," ANSI X3, 271–1996, p. 19.

* cited by examiner

METHOD AND APPARATUS FOR EMULATING A FIBER CHANNEL PORT

TECHNICAL FIELD

The present invention relates to a method and apparatus for emulating a fibre channel port, particularly for accessing multiple targets from a single port.

BACKGROUND OF THE INVENTION

The IEEE standard digital communications protocol known as the fibre channel was developed to solve a number of problems known in the art of computer communications. Prior communications protocols, e.g., SCSI (Small Computer Systems Interface) and FICON (Fibre Connection), evolved to require specialized hardware so that multiple protocols could not be supported by the same hardware. Moreover, many prior communications protocols were severely limited in the distances that data could be transported. For example, SCSI is typically limited to 25 meters. The fibre channel protocol addresses both of these problems.

The fibre channel protocol permits data transfers over global distances, and employs a layered strategy providing for the use of other protocols without the requirement for specialized hardware. Particularly, fibre channel acts as a lower layer that views data as standardized packets or frames upon which upper layers, such as SCSI and FICON, may be provided for interpreting the data at the ends of the transmission.

The fibre channel protocol employs two kinds of ports. "N" ports are coupled to peripheral devices with which a computer communicates, and so-called "fabric" ports which are switches within a network of switches that is termed a fabric. There are typically a very large number of fabric and N ports. The N ports are typically arranged in a plurality of distinct loops.

A data packet according to the fibre channel protocol employs three bytes of addressing information. Two of the bytes specify the switches in the fabric to be used to steer the packet to a desired one of the loops. The other byte specifies the address of the N port corresponding to a desired peripheral in the desired loop. Accordingly, another of the advantages of the fibre channel protocol is that a large number of peripheral devices can be addressed.

As can be seen, the fibre channel protocol presumes communication through switches and N ports and, therefore, presumes direct communication with the peripheral devices. A problem arises, therefore, whenever the fibre channel protocol is to be used for communicating with N ports to which no devices are currently connected. This situation occurs, for example, in a library of computer memory elements wherein shelved storage elements must typically be brought to an input/output ("I/O") station for connection to the port some time after the address identifying the storage element is received.

Accordingly, there is a need for a method and apparatus for emulating a fibre channel port that provides for accessing peripheral devices that are not currently coupled to a port, such as in a library of computer memory elements.

SUMMARY OF THE INVENTION

Disclosed is a method and apparatus for emulating a fibre channel port according to the present invention that is particularly adapted for use in a library of computer memory elements. The memory elements are shelved in associated storage locations in the library. A robotic picker is used to move within the library, to couple and decouple a selected memory element from a destination receptacle that is in turn coupled to one or more host computers requesting particular data. A controller is provided according to the invention that includes a fabric port and a virtual N port. The controller is adapted to buffer incoming data and convert an N port address provided with the data by a host computer to an instruction to the picker to couple the disk drive corresponding to the requested N port address to the virtual N port.

Therefore, it is a principal object of the present invention to provide a novel and improved method and apparatus for emulating a fibre channel port.

It is another object of the present invention to provide a method and apparatus for emulating a fibre channel port that provides for accessing peripheral devices that are not currently coupled to a port, such as in a library of computer memory elements.

It is still another object of the present invention to provide such a method and apparatus for use in a library of hard disk drives.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
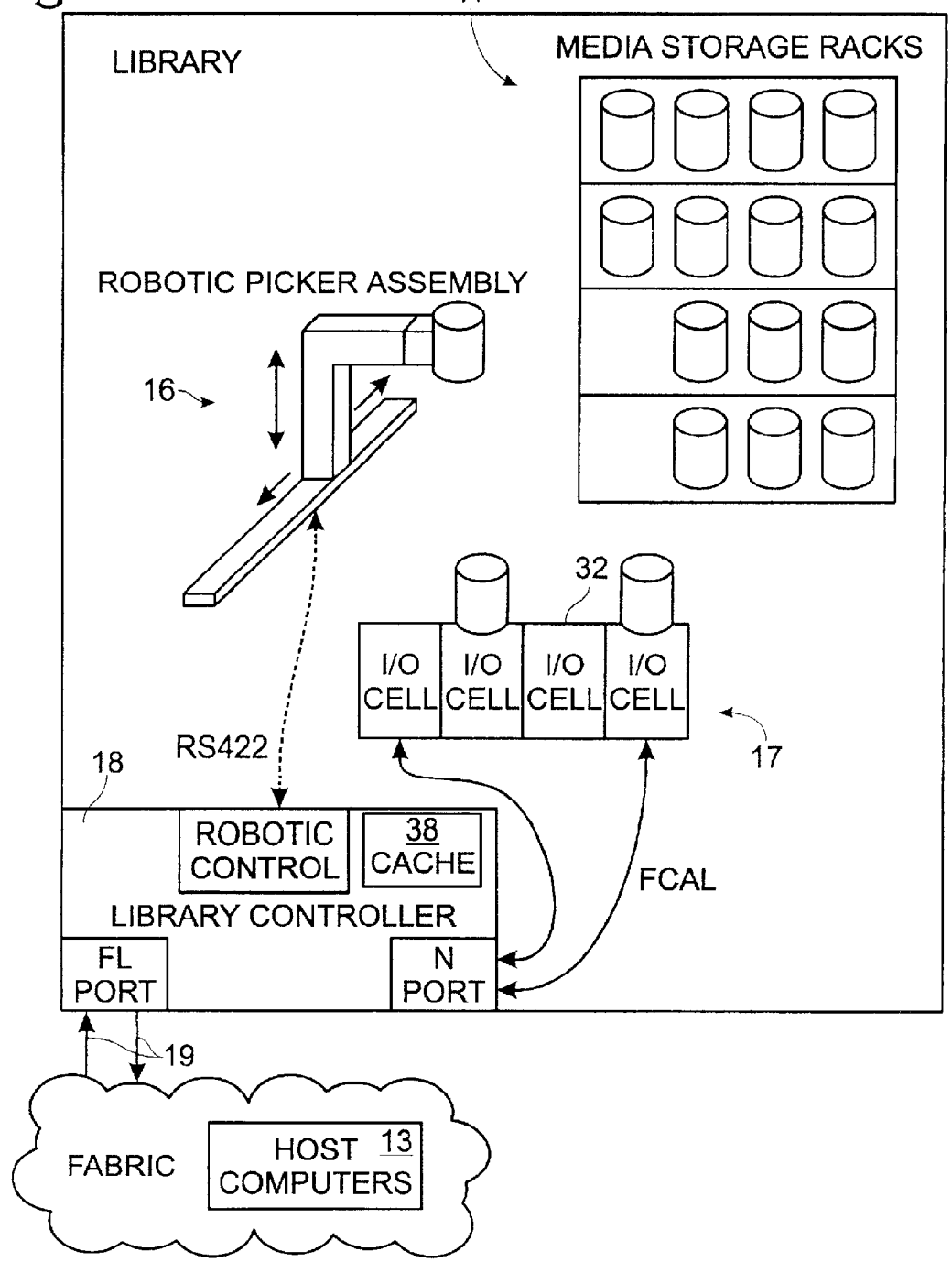
FIG. 1 is a schematic of a library of hard disk drives and a controller for the library according to the present invention.

Referring to FIG. 1, a library 10 of computer memory elements 11 according to the present invention is shown. The library includes a number of storage locations 12 for shelving, containing, or otherwise storing as many or fewer of the memory elements 11. Typical library memory elements are optical or tape media, which are requested by a host computer, fetched by a robotic picker 16 and placed into destination I/O cells 17 coupled to one or more of the host computers, to permit the requesting host computer to read or write data to the selected media.

It is believed that the present invention is employed to greatest advantage in a library of hard disk drives 14. The hard disk drives have magnetic hard disk media installed therein, so that the hard disk drives are fully functional computer memory elements. The hard disk drives require only power and input/output (hereinafter "I/O") connections to a host computer for reading the data on the hard disk media or for writing data thereto. In a basic form of the library, the I/O cells 17 include these features. The basic library of hard disk drives is described more fully in the assignee's companion application entitled LIBRARY OF HARD DISK DRIVES WITH TRANSPARENT EMULATING INTERFACE, executed on Apr. 9, 2001 by inventors Kamal Dimitri, Robert G. Emberty, Craig Klein, and Daniel J. Winarski, filed on Apr. 26, 2001, and incorporated herein by reference in its entirety.

Notwithstanding, emulating a fibre channel port according to the present invention may be of value whenever it is desired to communicate with peripheral devices that are not necessarily ready at the time that a host computer issues a command to read or a write.

More particularly, the invention may be employed in the context of a library of other computer memory elements 11 such as optical or tape media; however, due to the historical development of such libraries, particularly the use of a relatively small number of address ports for coupling to a requested medium, the addressability advantages provided by the fibre channel standard are not fully realized. Accordingly, a preferred embodiment of a method and apparatus for emulating a fibre channel port will be described hereinafter in the context of a library of hard disk drives, it being understood that the method and apparatus may be employed in other settings without departing from the principles of the invention.

The library of hard disk drives typically provides for addressing individual disk drives in the library by the host computers directly. An example of how this may be carried out is provided in the aforementioned companion application. Since there may be a large number of disk drives in the library, the communications strategy must typically provide for directly addressing a large space. The fibre channel standard provides for three bytes of addressing information, namely source, destination and "AL" portions of an address field, wherein the AL portion defines 127 devices. The first two bytes define (65,536-1) addresses, and the 127 devices addresses defined by the last byte combine to provide for addressing as many as 8,322,945 hard disk drives, according to the present invention.

The library includes a library controller 18 having a fabric port "FL" connected to a communications line or interface 19 with one or more host computers which are part of a "fabric," and a virtual "N port," which terminology describes a device port (as opposed to a switch port) according to the fibre channel protocol. The controller maps the fabric address and AL address to a physical drive, and instructs the picker 16 to couple the selected drive to an I/O cell coupled to the virtual N port, or directly to the host computer. The required mechanical movement of the picker delays the time at which the selected drive is available to the host computer for reading or writing. Therefore, the host computer cannot address the drive as intended in the fibre channel protocol without some additional action on the part of the controller.

According to a preferred embodiment of the invention, the controller employs two alternative strategies for solving this problem. First, the controller may simply inform the host D computer that the drive is not yet ready and instruct the host computer to hold off the read or write operation until the drive is ready. Second, the controller may cache the data if the host computer is attempting to write, and it may hold data in cache, if the computer is attempting to read. This second strategy is described in connection with the description provided immediately below.

Figure 2:
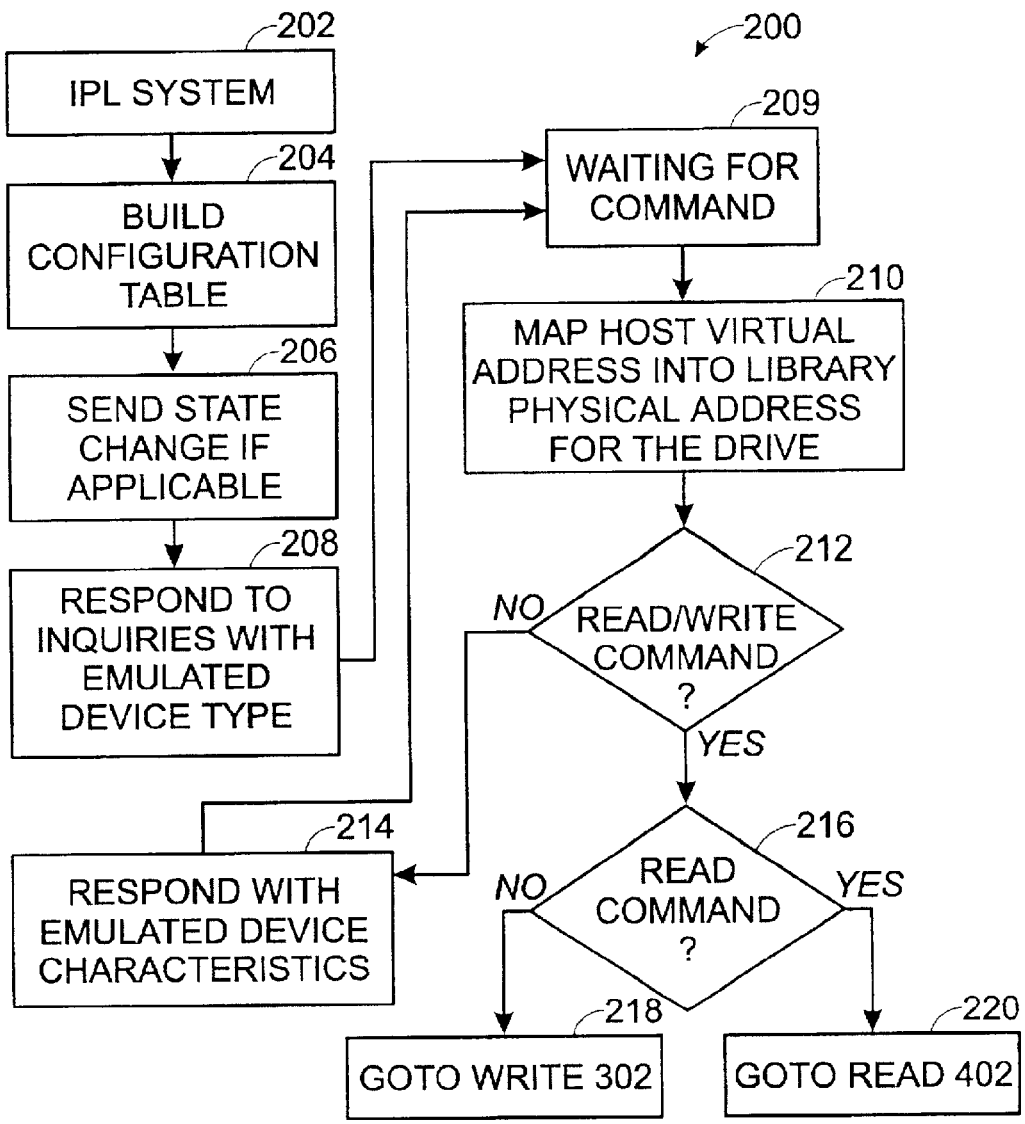
FIG. 2 is a flow chart of an I/O sort process for operating the library of FIG. 1 according to the present invention.
Figure 3:
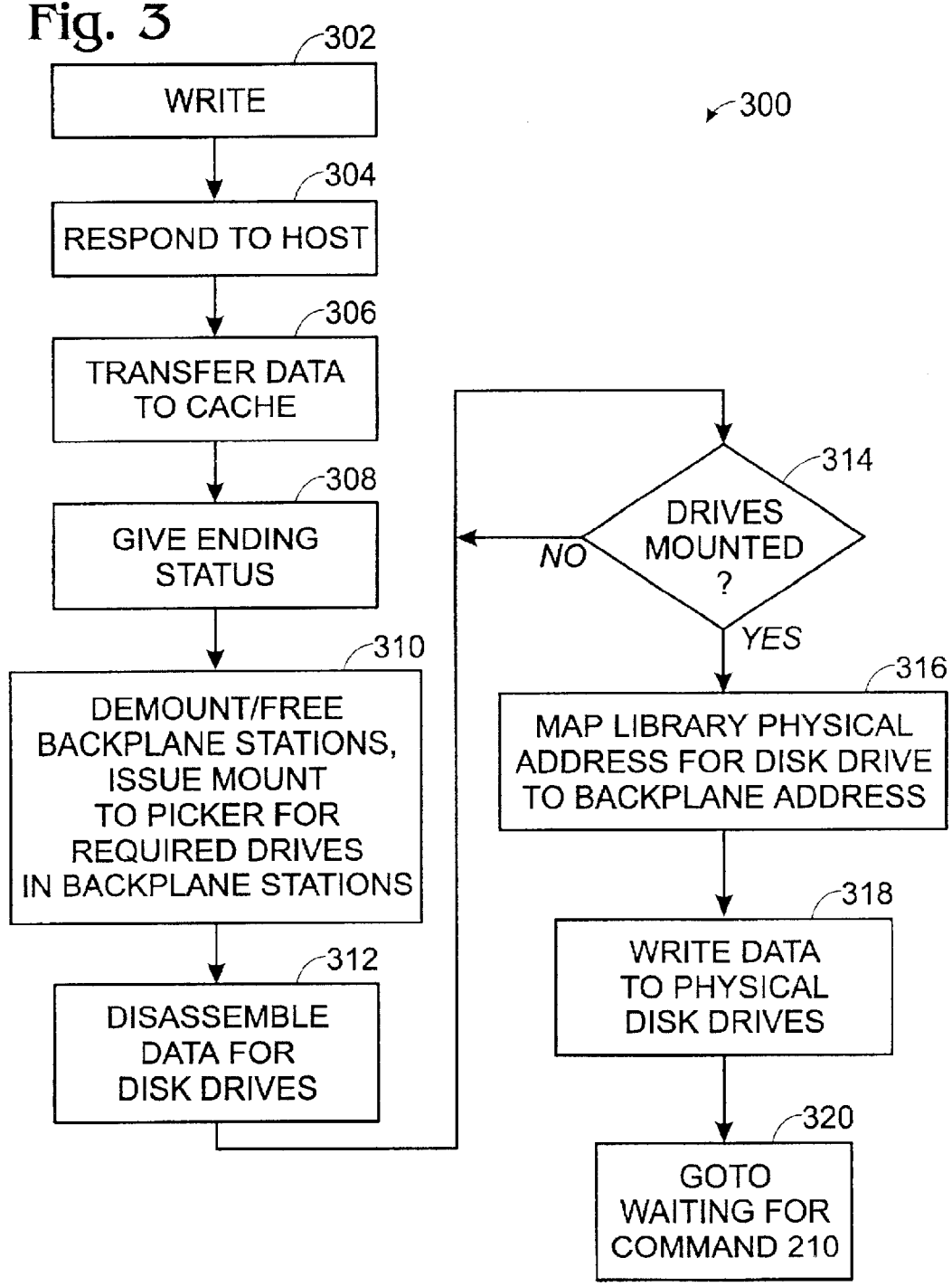
FIG. 3 is a flow chart of a write process for writing data to a selected hard disk drive according to the present invention.
Figure 4:
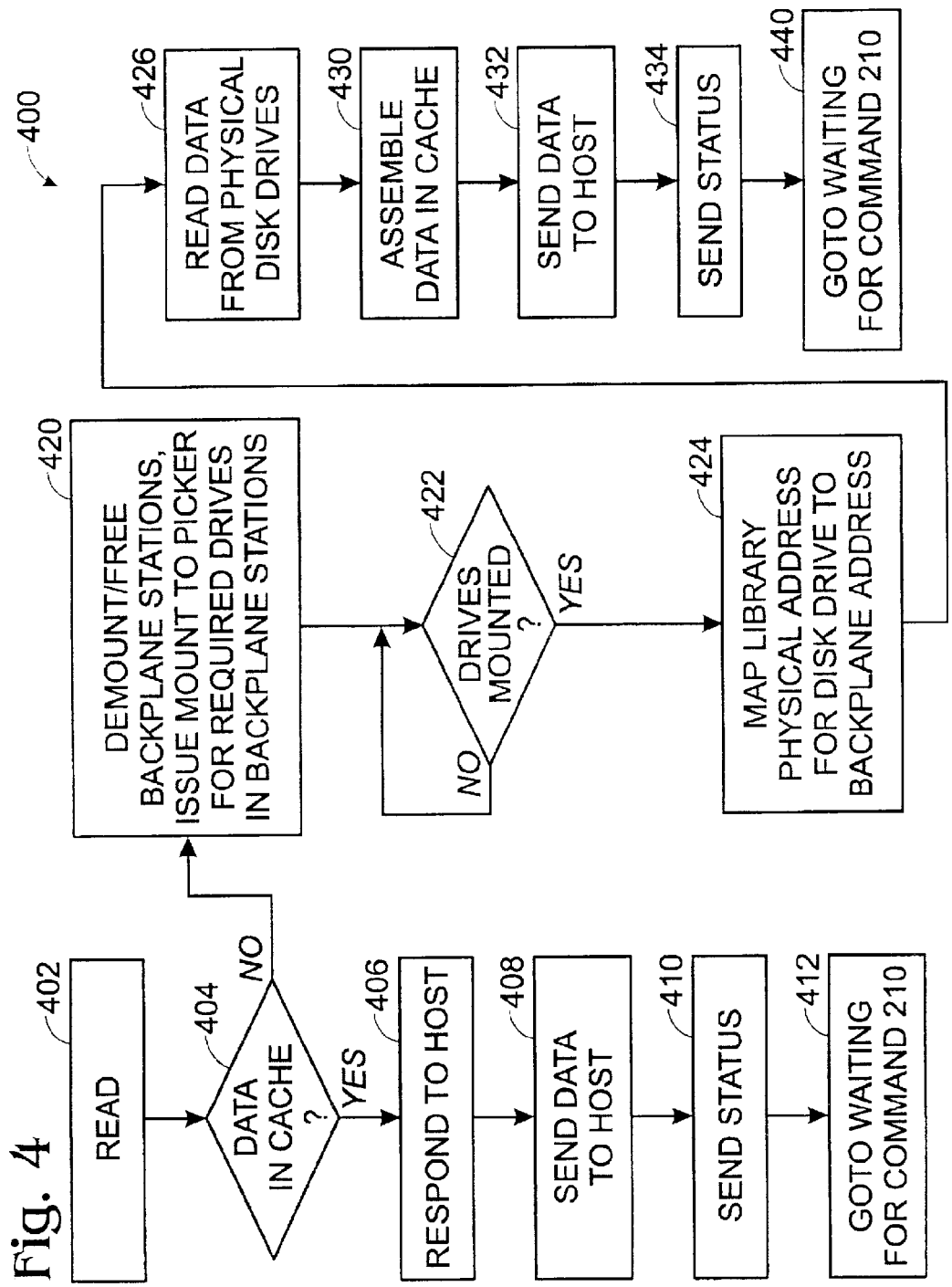
FIG. 4 is a flow chart of a method for a read process for reading data from a selected hard disk drive according to the present invention.

Turning to FIGS. 2–4, flow charts illustrating preferred operation of the controller 18 are provided. In FIG. 2, an I/O sort process 200 begins with an "initial program load" step 202, which boots the library controller for carrying out the steps described below. The program code for step 202 is typically stored in an EPROM (Erasable Programmable Read Only Memory), a high-density floppy disk drive, a CD-ROM disk drive or the like.

In step 204 of the I/O sort process 200, the controller builds a "configuration table," which is a map or index of the physical addresses of the disk drives in the library corresponding to the logical addresses of the same drives by which the drives are known to the host computers.

As part of step 204, the picker 16 is commanded by the library controller to identify and shelve the disk drives 11 received through the mail slot. The disk drives preferably include externally accessible identifying indicia, such as may be coded on a label or in EPROM attached thereto that is scanned or read at the picker. Alternatively, the controller may instruct the picker to power up the disk drive and read identifying information coded on the disk itself In any event, according to the invention, the controller learns the logical addresses of the disk drives and creates the configuration table as a result of shelving the drives. As can be readily appreciated, there may be more than one configuration table if multiple hosts are connected to the library.

With the configuration table constructed, the controller 18 is enabled to translate host 0 requests from specified logical addresses to actual physical addresses, and instruct the picker to locate and mount the appropriate disk drive to an appropriate connector of the destination receptacle 17. In step 206, the configuration table is updated over time by the controller, as disk drives may be reshelved for a variety of reasons in different storage bins 12 than the storage bins in which they were initially stored or from which they were initially retrieved, and because disk drives may not currently be shelved but, rather, may already be mounted to the destination receptacle or currently in the possession of the picker.

The I/O sort process 200 continues with a step 208, wherein the library tells the host computers what device it is emulating. For example, the library may tell the host that it is a SCSI disk drive of a specified capacity, which may be of any size. The device or selected form of mass storage that the library is emulating establishes a handshaking protocol, for communicating with the host computer, which the library controller emulates so that the host computer communicates with the library controller as though the library is that device or selected form of mass storage.

In step 209, the controller 18 waits for a command from one of the host computers. The command will typically be accompanied by a logical address. Accordingly, in step 210, the logical address specified by the host is mapped by the library controller to the corresponding physical address in the library by consulting the configuration table as updated in step 206. In step 212, the controller determines whether the command is an I/O command. The library is adapted so that, if the command is not an I/O command, the library will respond to the command in the same way that the emulated device would respond to the command. Otherwise, the controller branches to a write process 300 for responding to a write command, or a read process 400 for responding to a read command.

Turning to FIG. 3, a preferred write process 300 for the library 10 with transparent emulating interface according to the invention is illustrated, that begins with receipt of a write command 302. In step 304, the library controller responds to the host computer to signal its readiness to receive the data, the physical address to which the data are to be written having previously been identified in step 210 of the I/O sort process 200. When the controller receives the data, in step 306, the controller preferably transfers the data immediately to solid state cache memory 38 (FIG. 1), which can be accessed much faster than the hard disk drives in the library, so that the host computer need not wait for the library to carry out the complete write process. Then, in step 308, the controller signals the host that the data has been received.

In step 310, the controller determines whether the requested hard disk drive is already mounted. If not, the controller determines whether there is a free slot 32 (FIG. 1) for mounting the hard disk drive to the destination receptacle. If so, the requested hard disk drive is mounted in the free slot. If not, the least recently mounted or least frequently used hard disk drive is preferably selected to be demounted from the destination receptacle 17 to provide such a free slot for mounting the requested hard disk drive.

In an optional step 312 of the preferred write process 300, the data are disassembled for distribution over a RAID (Redundant Array of Independent Disks) or other form of distributed storage. Where distributed storage is to be used, the aforementioned step 310 is modified accordingly. Next, in step 314, the controller determines whether the picker has mounted the hard disk drive or drives. Once all of the drives are mounted to the destination receptacle 17, the controller performs another mapping, to update the physical address to indicate the slot in the destination receptacle in which the disk drive is mounted (step 316).

In step 318, with the hard disk drive or drives mounted, the controller spins the hard disk drives up to operating speed and writes the data. The process branches back to the I/O sort process 200 at step 210.

Turning to FIG. 4, a preferred read process 400 for the library 10 with transparent emulating interface according to the invention is illustrated, that begins with receipt of a read command 402. In step 404, the library preferably checks the cache memory 38 to determine whether the requested data are readily available. The controller may anticipate the need for particular data based on the history of data requests for the particular host or the hosts generally and place the particular data in cache in advance of the read command. If the data are in cache, the controller simply informs the host that it is ready to send the data (step 406), sends the data (step 408), and sends an indication to the host that the data has been sent (step 410), before returning to the I/O sort process 200 at step 210.

On the other hand, if the data are not available in cache, the controller (step 420) determines whether the requested hard disk drive is already mounted. If not, the controller determines whether there is a free slot 32 (FIG. 1) for mounting the hard disk drive to the destination receptacle. If so, the requested hard disk drive is mounted in the free slot. If not, the least recently mounted or least frequently used hard disk drive is preferably selected to be demounted from the destination receptacle 17 to provide such a free slot for mounting the requested hard disk drive.

Next, in step 422, the controller determines whether the picker has mounted the hard disk drive or drives. Once all of the drives are mounted to the destination receptacle 17, the controller performs another mapping, to update the physical address to indicate the slot in the destination receptacle in which the disk drive is mounted (step 424).

In step 426, with the hard disk drive or drives mounted, the controller spins the hard disk drives up to operating speed and reads the data. If the data are read from distributed storage as mentioned above, the data are preferably assembled in the cache 38 (step 430), and the aforementioned step 420 is modified accordingly. The controller then sends the data to the host (step 432), and sends an indication to the host that the data has been sent (step 434), before returning to the I/O sort process 200 at step 210.

The communications interface 19 may be implemented in wires or optical fibers, or may be wireless. Preferably, the interface 19 makes use of a protocol known as a fibre channel arbitrated loop, specified by ANSI X3.230-1994, X3.297-1997, and X3.303-1998, each incorporated by reference herein. The fibre channel loop is implemented as a lower layer protocol that effectuates the transmission of data as frames. It can support any desired upper layer protocol for interpreting the data in the frames, such as but not limited to FCP SCSI or FICON (Fibre Connection), without the need for specialized hardware. For example, the library controller can act as a set of servers, a set of SCSI hard disks, a FICON storage subsystem, or a combination of these.

As an outstanding feature of the invention, a command/protocol translation table is provided for use by the controller 18 that permits the controller to associate a plurality of commands with various emulated devices for which the commands are adapted in the fibre channel arbitrated loop protocol. The controller may identify the command by identifying the device.

In turn, a command/code translation table is provided for associating the various commands with associated microcode particularly adapted for controlling respective memory elements in the library, as selected by the controller, to execute the command transparently to the host. The controller selects the library resource and the appropriate microcode is identified and executed, to carry out the host command in the library.

The command/protocol and command/code tables are only exemplary of associations or references made according to the present invention. Such look-up tables may be implemented in any manner known in the art, and the tables need note be maintained or employed separately.

As an example of a translation according to the present invention, the host may send a data packet according to the fibre channel arbitrated loop protocol with "MMMMMM01" appended, where the "M's" represent modifer bits. Then, the controller 18 interprets the command as a command to write to a hard disk drive, reformats the command into a format for use internally in the library, and writes the data to any selected library resource which may also be one or more hard disk drives. If a "MMMMMM10" is received, the controller interprets the command as a read command, reads the desired data from the selected library resource, formats the data as a fibre channel arbitrated loop data packet and sends the data to the host. If a "MMMM0100" is received, the controller interprets the command as a sense command, which is an example of a non-I/O command. The controller carries out the commands with its own internal command and control protocol and replies to the host in the fibre channel artibtrated loop format.

The library may also emulate one device to one host and one device to another host. It is an outstanding feature of the invention that the controller is multi-lingual without any need to change the controller's operating microcode. Accordingly, the library may communicate in a variety of different ways with a variety of different hosts on demand.

Figure 5:
FIG. 5 is an article of manufacture according to the present invention.

Turning to FIG. 5, an article of manufacture 100 is shown which tangibly embodies one or more programs of executable computer instructions for causing the controller 18 to perform steps according to the present invention is shown.

For example, the article of manufacture 100 may be used to store coding for the steps described in connection with the I/O sort process 200, write process 300 and read process 400. The article of manufacture 100 is shown as a floppy disk; however, any other computer readable storage medium may be employed without departing from the principles of the invention.

It is to be recognized that, while a particular method and apparatus for emulating a fibre channel port has been shown and described as preferred, other configurations and methods could be utilized, in addition to those already mentioned, without departing from the principles of the invention. It is to be further recognized that processes and methods according to the invention may be implemented as articles of manufacture by using standard techniques to produce computer-readable storage media, such as computer software, firmware and hardware, tangibly embodying programs of executable computer instructions in memory or transmitting devices. Examples of such memory devices are hard disk drives, floppy diskettes, optical disks, magnetic tape, and semiconductor memories such as ROM (Read Only Memory), PROM (Programmable Read Only Memory) and EPROM, and examples of such transmitting devices are the Internet, electronic bulletin boards and message/note exchanges, networks including telephone/modem, cable and cellular networks, radio and satellite communications systems, and other stationary or mobile systems and communications links. One skilled in the art of computer science will easily be able to implement any process or method according to the invention with a general purpose computer as described herein or with or in combination with more specialized hardware.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method for communicating between a host computer and a library of one or more types of memory elements controlled by a library controller, comprising the steps of:
    forming a first association of a plurality of commands for instructing a plurality of different types of memory elements which the host computer expects the library to be according to a fibre channel protocol;
    forming a second association of said plurality of commands and a plurality of codes particularly adapted for controlling respective memory elements in the library;
    receiving a command from a host computer according to the fibre channel protocol;
    identifying the type of memory element which the host computer expects the library to be;
    identifying said command by consulting said first association;
    selecting, by the controller, one or more of the memory elements in the library for carrying out the command;
    identifying the associated said code by consulting said second association for said selected memory elements; and
    executing the identified code for carrying out the command in the library with said selected memory elements.

2. The method of claim 1, wherein said step of executing the identified code further comprises reading data from a hard disk drive in the library, formatting said data according to the identified said protocol, and thereafter sending said data to the host computer.

3. The method of claim 1, wherein the step of carrying out the executed code further comprises writing to a hard disk drive in the library.

4. An article of manufacture for use in communicating between one or more host computers and a library of one or more types of memory elements controlled by a library controller, said article of manufacture comprising a computer-readable storage medium tangibly embodying a program of executable computer instructions which cause said controller to perform steps comprising:
    forming a first association of a plurality of commands for instructing a plurality of different types of memory elements which the host computer expects the library to be according to a fibre channel protocol;
    forming a second association of said plurality of commands and a plurality of codes particularly adapted for controlling respective memory elements in the library;
    receiving a command from a host computer according to the fibre channel protocol;
    identifying the type of memory element which the host computer expects the library to be;
    identifying said command by consulting said first association;
    selecting, by the controller, one or more of the memory elements in the library for carrying out the command;
    identifying the associated said code by consulting said second association for said selected memory elements; and
    executing the identified code for carrying out the command in the library with said selected memory elements.

5. The article of manufacture of claim 4, wherein said program of computer instructions may cause said library controller to execute the identified code at least by reading data from a hard disk drive in the library, formatting said data according to the identified said protocol, and thereafter sending said data to the host computer.

6. The article of manufacture of claim 4, wherein said program of computer instructions may cause said library controller to execute the identified code at least by writing to a hard disk drive in the library.

7. A method for emulating a fibre channel port, comprising the steps of:
    receiving a communication request including a fibre-channel-standard address;
    converting the fibre-channel-standard address to a physical address corresponding to a peripheral device not currently connected to a fabric port;
    fetching the first peripheral device; and
    coupling the peripheral device to the fabric port.

8. The method of claim 7, wherein the fabric port is electrically connected to an input/output cell and said step of coupling the peripheral device to the fabric port includes electrically connecting the peripheral device to the input/output cell.

9. The method of claim 7, further comprising the steps of:
    waiting for the peripheral device to be coupled to the fabric port; and
    communicating with the peripheral device.

10. The method of claim 7, further comprising the steps of:
    receiving data before the step of coupling the peripheral device to the fabric port is completed;

storing said data; and writing said data to the peripheral device after the step of coupling the peripheral device to the fabric port has completed.

11. The method of claim 9, further comprising the steps of:

obtaining data during the step of communicating with the peripheral device; and interpreting the data using an upper layer protocol.

12. An article of manufacture including a data storage medium, said data storage medium including a set of machine-readable instructions that are executable by a processing device to implement an algorithm, said algorithm comprising the steps of:

receiving a communication request including a fibre-channel-standard address;

converting the fibre-channel-standard address to a physical address corresponding to a peripheral device not currently connected to a fabric port;

fetching the first peripheral device; and coupling the peripheral device to the fabric port.

13. The article of manufacture of claim 12, wherein the fabric port is electrically connected to an input/output cell and said step of coupling the peripheral device to the fabric port includes electrically connecting the peripheral device to the input/output cell.

14. The article of manufacture of claim 12, further comprising the steps of:

waiting for the peripheral device to be coupled to the fabric port; and communicating with the peripheral device.

15. The article of manufacture of claim 12, further comprising the steps of:

receiving data before the step of coupling the peripheral device to the fabric port is completed;

storing said data; and writing said data to the peripheral device after the step of coupling the peripheral device to the fabric port has completed.

16. The article of manufacture of claim 14, further comprising the steps of:

obtaining data during the step of communicating with the peripheral device; and interpreting the data using an upper layer protocol.

17. A method for emulating a fibre channel port, comprising the steps of:

receiving a communication request including a fibre-channel-standard address;

converting the fibre-channel-standard address to a physical address corresponding to a peripheral device not currently connected to a fabric port;

identifying the physical address as being associated with data residing within a temporary storage device; and fetching the data from the temporary storage device.

* * * * *

UNITED STATES PATENT AND TRADEMARK OFFICE
CERTIFICATE OF CORRECTION

PATENT NO. : 6,941,260 B2
DATED : September 6, 2005
INVENTOR(S) : Robert G. Emberty et al.

It is certified that error appears in the above-identified patent and that said Letters Patent is hereby corrected as shown below:

<u>Title page,</u>
Item [75], Inventors, change the city and state of "Gregory A. Williams" to
-- Grand Rapids, MI --.
Item [56], References Cited, U.S. PATENT DOCUMENTS, add
-- 6,022,180     2/2000  Motoyama et al. --.

Signed and Sealed this

Fifteenth Day of November, 2005

JON W. DUDAS
*Director of the United States Patent and Trademark Office*